United States Patent
Khansari et al.

[19]

[11] Patent Number: 6,141,448
[45] Date of Patent: Oct. 31, 2000

[54] LOW-COMPLEXITY ERROR-RESILIENT CODER USING A BLOCK-BASED STANDARD

[75] Inventors: Masoud Khansari, Sunnyvale; Vasudev Bhaskaran, Mountain View, both of Calif.

[73] Assignee: Hewlett-Packard, Palo Alto, Calif.

[21] Appl. No.: 09/017,515

[22] Filed: Feb. 2, 1998

Related U.S. Application Data

[60] Provisional application No. 60/043,932, Apr. 21, 1997.

[51] Int. Cl.$^7$ .............................. G06K 9/36; H04N 7/12; H04N 7/00
[52] U.S. Cl. ......................... 382/236; 382/238; 348/415; 348/466
[58] Field of Search .................................. 382/238, 232, 382/236, 245, 246; 348/420, 403, 415, 466; 386/111, 109; 364/737; 371/35, 37.1, 31, 37.7

[56] References Cited

U.S. PATENT DOCUMENTS

| | | | |
|---|---|---|---|
| 4,371,270 | 2/1983 | Yamada | 714/755 |
| 5,111,463 | 5/1992 | Zook | 714/762 |
| 5,771,081 | 6/1998 | Lee | 348/390 |
| 5,933,567 | 8/1999 | Lane et al. | 386/68 |
| 5,933,571 | 8/1999 | Bannai | 386/109 |

OTHER PUBLICATIONS

Keith Jack "Video Demystified A Handbook for the Digital Engineer", 1996, High Text Interactive, Inc., pp. 601–657.

Stephen J. Solari "Digital Video and Audio Compression", 1997, McGraw–Hill Companies, Inc., pp. 213–237.

Eckehard Steinbach, Niko Farber, Bernd Girod "Standard Compatible Extension of H.263 for Robust Video Transmission in Mobile Environments", 1996, IEEE, pp. 1–26.

Chunrong "Chad" Zhu "RTP Payload Format for H.263 Video Stream", Internet Engineering Task Force (IETF) Internet–draft, Jun. 1996, pp. 1–9.

"Description of Error Resilient Core Experiments", Report of ad–hoc group on core experiments on error resilience aspects in MPEG–4 video, ISO/IEC JTC1/SC29/WG11, Apr. 1997, pp. 1–44.

M. Khansari, A. Jalali, E. Dubois and P. Mermelstein "Low Bit–Rate Video Transmission Over Fading Channels for Wireless Microcellular Systems", IEEE Trans. on CAS for Video Tech., Feb. 1996, pp. 1–11.

"Line Transmission of Non–Telephone Signals—Video Coding For Low Bitrate Communication", May 2, 1996, International Telecommunication Union, pp. 1–55.

*Primary Examiner*—Thomas D. Lee
*Assistant Examiner*—Wenpeng Chen

[57] ABSTRACT

Disclosed is an error-correction method and apparatus for transmission of block-based coding standard compliant video data, such as H.263, MPEG or JPEG. A picture is divided into slices wherein each slice of the picture is coded into a group of blocks (GOB) in which each macroblock in the GOB is encoded only with reference to other macroblocks in the same GOB. An erasure slice, which is also a GOB, is then formed wherein the data for each macroblock of the erasure slice is determined by summing a corresponding macroblock in each of the GOBs containing slices of the picture. The GOBs containing slices of the picture are then transmitted, along with the GOB containing the erasure slice, as block-based coding standard compliant data packets. The result is that if any one of the GOBs containing slices of the picture is lost, then the lost GOB can be reconstructed from the remaining GOBs and the erasure slice.

33 Claims, 13 Drawing Sheets

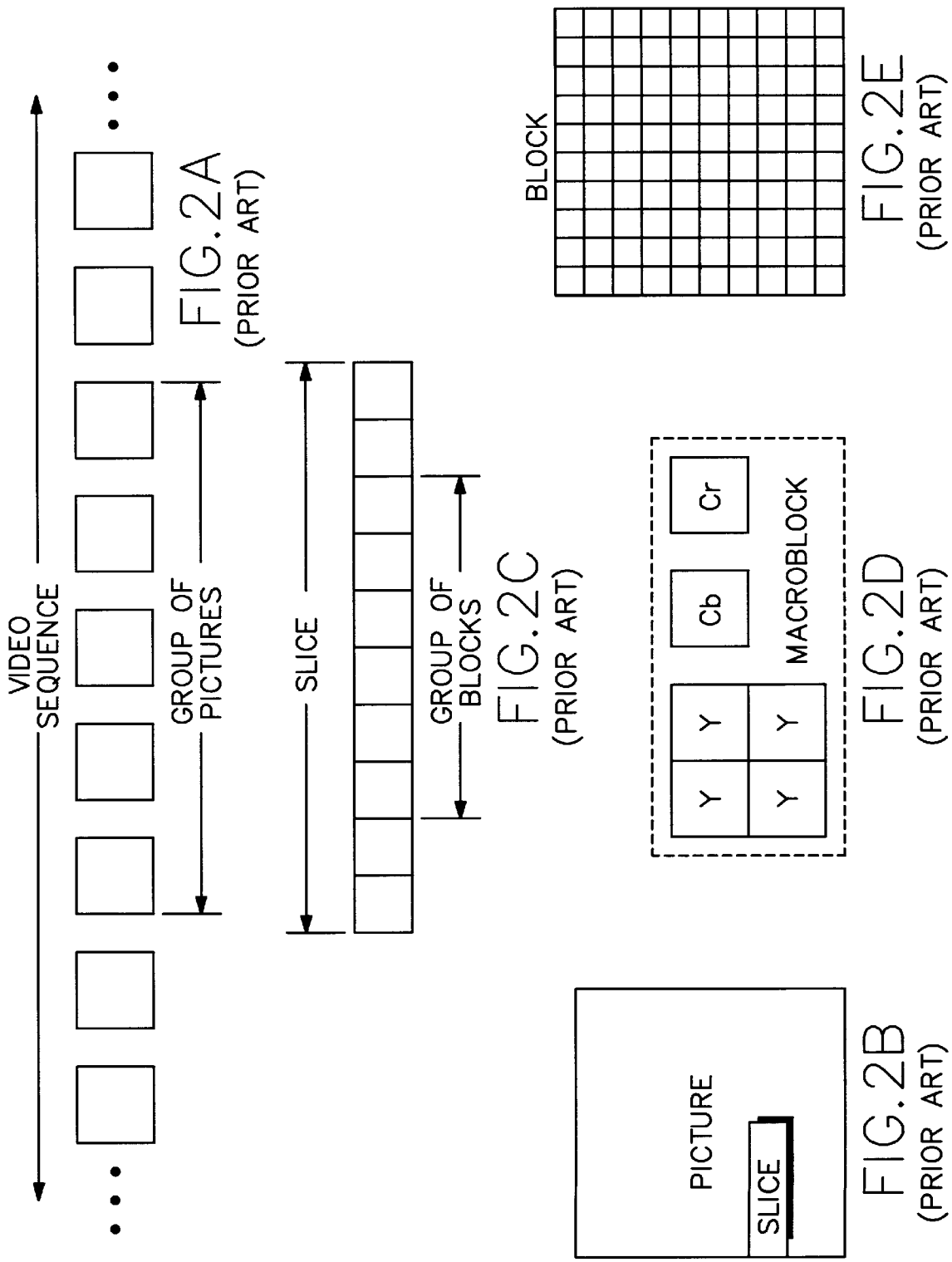

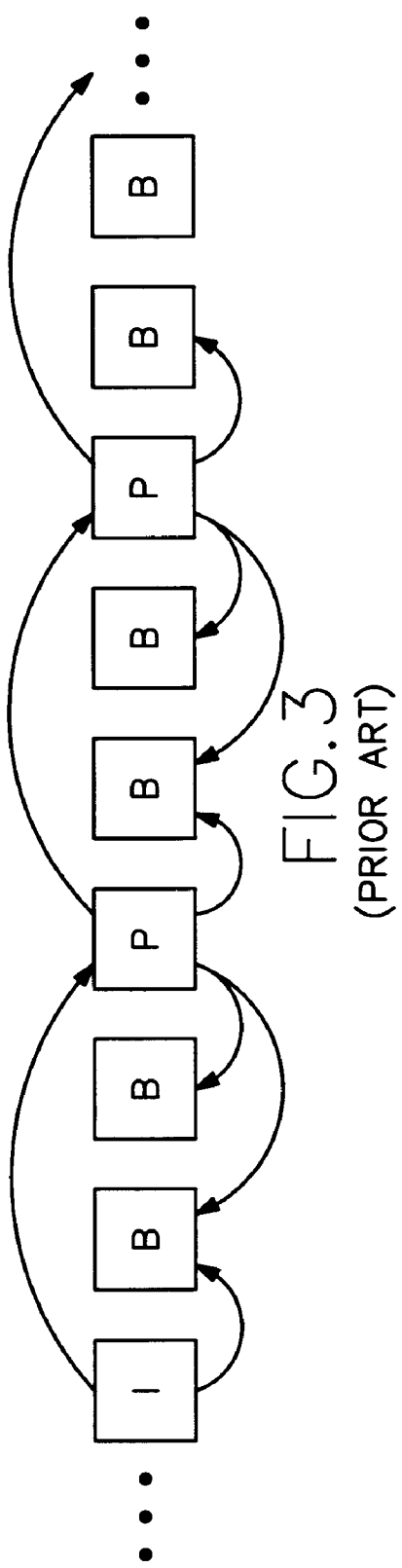
FIG. 3 (PRIOR ART)
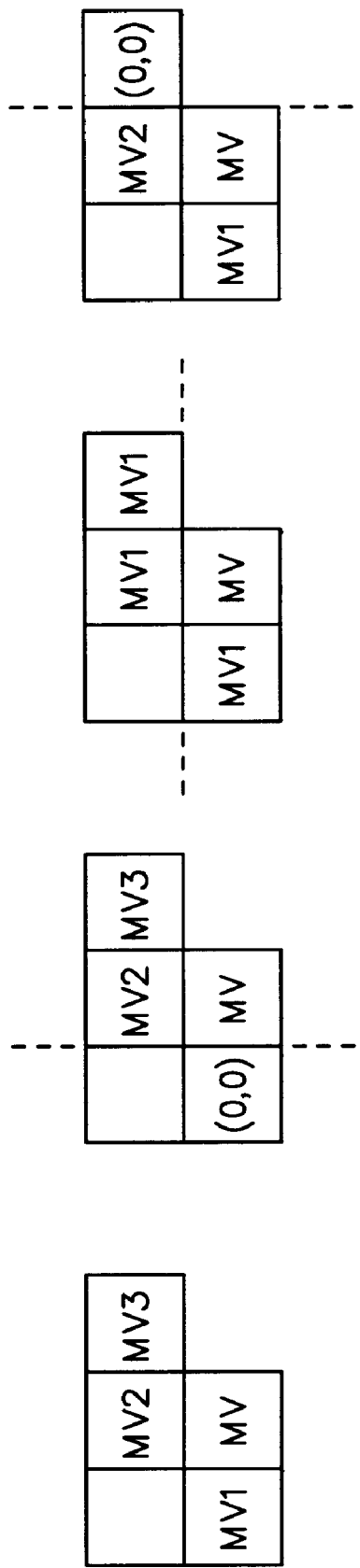
FIG. 4 (PRIOR ART)
FIG. 5 (PRIOR ART)
FIG. 6 (PRIOR ART)
FIG. 7 (PRIOR ART)

LOW-COMPLEXITY ERROR-RESILIENT CODER USING A BLOCK-BASED STANDARD

This application claims benefit of Provisional application Ser. No. 60/143,932 filed Apr. 21, 1997.

BACKGROUND OF THE INVENTION

1. Field of the Invention

This invention relates generally to error correction methods and more particularly to an error correction method which is compatible with block-based coding standards, such as the H.263 standard of the ITU.

2. Description of the Related Art

Block-based video compression algorithms such as H.26x ITU family, JPEG or MPEG efficiently compress video sequences, such as that shown in FIG. 1, which contain motion sequences. The compressed video information, however, is more sensitive to transmission errors caused by channel impairments. In fact, the more compressed the signal, the more information is carried by an individual bit, which will result in increased distortion in the reconstructed signal if a bit is decoded incorrectly. Moreover, catastrophic events, such as loss of synchronization of the transmission link, occur if even one bit is incorrectly decoded.

Many applications, such as video conferencing over the internet or video transmission over wireless links, require low bit-rate coding. Sophisticated methods have been implemented to remove signal redundancies in both the spatial and temporal dimensions of the image data. But transmission channels used to transfer the image data tend to experience many errors. For example, one can expect a Bit Error Rate (BER) as high as $10^{-3}$ in wireless links. In the case of internet communication links, it is not unusual to lose about 10% of the transmitted data packets. Therefore the transmission of highly compressed signals over channels with high error rates is quite challenging. The fact that errors can occur in bursts, e.g. when the radio link is fading, adds another challenging dimension to this problem.

Another aspect of the problem is the fact that video transmission is usually achieved via a packet-based stream and not bitstream based communication. In such an environment, it is possible to lose an entire packet of video data. This can, for example, occur due to buffer overflow in the routers or switches in the intermediate nodes of the network. Usually, these packets contain a Cyclic Redundancy Code (CRC) or check-sum that is powerful enough to detect packets received with errors. It is generally still possible to parse and decode a packet with errors, however, the decoded information is not reliable and should be used with care.

In addition to the problems above, real-time applications have stringent delay constraints and packets arriving late at the destination should be considered lost packets. It is therefore necessary to consider issues surrounding packetization since organization and arrangement of the transmitted data can significantly affect the robustness of the video transmission system.

In response to these problems, several standardization bodies, such as ITU (H.223), ISO-MPEG (MPEG4) and IETF (e.g. drafts proposing RTP payload format for encapsulating real-time bit streams) have proposed transmission standards which address these issues. The goal of the standards is generally to be able to decode each data packet independently from other packets in the transmission stream so that the loss of one packet does not affect the ability to decode subsequent packets. In other words, each packet should be an independent and self-contained unit.

An important aspect of present transmission media is their time-varying characteristic. For example, congestion can occur in the internet which causes long transmission delays or consecutive packet losses. A simple remedy for this problem is to lower the transmission rate of the sources, hence permitting the network to clear the backlog of packets. The class of coders which modify their transmission rate based upon network conditions are known as rate-adaptive source coders. These coders, however, operate on the assumption that a back channel is available from the network to the transmitter which provides the source coder with the status information for the network. In some instances, such as where there are long transmission delays (e.g. satellite links or store and forward networks), it is not possible to operate this feedback channel on a timely basis and open-loop transmission methods must be used.

A. Packetization of the H.263 Data Stream

H.263 has emerged as the dominant video coding standard for applications requiring low bit-rate coding, replacing H.261 which was mainly intended for video conferencing applications.

FIG. 1A is a functional block diagram which illustrates a conventional H.263 encoder 40. An incoming video stream which contains image picture data passes through subtractor 49 to DCT 41 which transforms the input residual pixel data into DCT residual data that is input to quantizer 42. The incoming video stream is also input to inter/intra classifier 45 and quantizer adaptor 46. Inter/intra classifier 45 also receives a picture type signal PTYPE, which indicates the type of the incoming picture data, and determines the value of the INTER/INTRA signal based upon the incoming video stream and PTYPE. Quantizer adaptor 46 observes the incoming video stream and determines the quantization signal QUANT.

The incoming video stream, the output of quantizer 42, the PTYPE signal and the INTER/INTRA signal are input to motion compensation generator 47 which compares past pictures to the present picture data in order to generate MOTION VECTORS for temporal compression of the picture data in the video stream. The motion compensation generator 47 also generates a subtraction picture signal which is input to subtractor 49.

Variable length encoder and multiplexor (MUX) 43 receives the output of quantizer 42, the PTYPE signal, the INTER/INTRA signal and the motion vectors in order to generate the H.263 data packets for a picture which are then stored in buffer 44 for output as a coded video stream.

The INTER/INTRA signal is also called the MTYPE signal of the H.263 specification. There are five MTYPE values in H.263: INTRA, INTRA+Q, INTER, INTER+Q and INTER4V. INTRA is the MTYPE corresponding to when a macroblock is encoded in intra-picture mode and the QUANT parameter is unchanged. INTRA+Q corresponds to an intra-picture encoding mode where QUANT is modified by DQUANT. Similarly, INTER corresponds to inter-picture, predictive, encoding where the QUANT parameter is unchanged and INTER+Q represents inter-picture encoding where QUANT is modified by DQUANT. INTER4V indicates that the macroblock is encoded with four motion vectors. In H.263, if the picture type PTYPE is I for INTRA, for intra-picture encoding, then the MTYPE for the macroblocks must be either INTRA or INTRA+Q. However, if PTYPE is P for predictive or inter-picture encoding, no similar restriction exists in the specification and it is possible to have INTRA values for the MTYPE of macroblocks for a P-type picture.

FIG. 1B is a functional block diagram illustrating a conventional H.263 decoder 50. The coded video stream generated by the conventional H.263 encoder 40 of FIG. 1A is received and stored in buffer 51. Variable length decoder and DMUX 52 decodes the H.263 data packets in buffer 51 and extracts the QUANT signal, INTER/INTRA signal, PTYPE signal and MOTION VECTORS as well as the picture data and the GOB HEADER INFO.

Inverse quantizer 53 receives the QUANT and INTER/INTRA signals which control the inverse quantization of the picture data decoded by variable length decoder and DMUX 52. The inverse quantized data output by inverse quantizer 53 is input to inverse DCT 54 which inverse transforms the picture data for output to adder 57. Motion compensation predictor 55 receives the PTYPE signal and MOTION VECTORS from variable length decoder and DMUX 52 as well as the decoded video stream output from adder 57 in order to produce motion compensated picture data which is input to adder 57 to reconstruct the original picture which is output as a video stream.

In H.263, as in other video encoding techniques such as MPEG, a video sequence consists of a sequence of pictures, as shown in FIG. 2A. A picture is the primary coding unit of the video sequence and generally consists of three rectangular matrices representing luminance Y and two chrominance values Cb and Cr. The Y matrix has an even number of rows and columns. Each of the Cb and Cr matrices are one-half the size of the Y matrix in each of the horizontal and vertical directions.

Each picture is constructed from a series of macroblocks MB where each MB consists of four luminance blocks, a Cb block and a Cr block, as shown in FIG. 2D. Each block, as shown in FIG. 2E, is an 8×8 matrix of pixels of the picture.

Pictures are divided into slices, one of which is shown in FIG. 2B, which consist of one or more contiguous MBs. The order of MBs in a slice is from left-to-right and top-to-bottom. If a bitstream contains an error, the decoder will typically skip to the start of the next slice from the slice which contains the error. A greater number of slices in the bitstream for the picture generally allows for better error concealment, but uses bits from the transmission channel which could otherwise be used to improve image quality.

For H.261 and H.263, macroblocks are also organized into groups of blocks GOBs, as shown in FIG. 2C. Similar to H.261, each GOB in H.263 has its own header. But the position of the GOB header in H.263, unlike H.261, is not fixed and can be varied to contain one or more slices, each slice being one horizontal row of MBs.

Motion compensation is a technique by which temporal redundancy between sequential pictures can be eliminated in order to compress the pictures. Motion compensation is performed at the MB level. When a MB is compressed, the compressed file contains a motion vector MV which represents the spatial difference between a reference MB and the MB being coded. The compressed file also contains error terms which represent the differences in content between the reference MB or MBs and the MB being coded.

There are three types of picture frame encoding that are common in various encoding standards, such as MPEG, H.261 and H.263. A frame which has no motion compensation and, therefore, has only been compressed by removing spacial redundancies is called an Intra block I. A P block is a frame wherein forward prediction is used to code the frame with reference to a previous reference frame. A subsequent frame can also be used as a reference in which case backward prediction is used. And a B frame is a frame wherein bi-directional prediction has been used where both a previous reference picture and a subsequent reference picture are used for coding. FIG. 3 demonstrates an MPEG sequence wherein an I picture is used as the reference picture to encode a P picture and a B picture. The P picture is used as a reference to encode B pictures and subsequent P pictures.

In an H.263 picture sequence, the first frame is an I frame, i.e. it is encoded in an intra-frame mode. The other frames are P frames except that H.263 permits two frames to be encoded together as "one" PB frame. This is different from MPEG where there are explicit P and B frame types. However, the relative encoding of the P and B frame types is similar to that for MPEG. Also, the location of PB frames can be arbitrary and there is no specific fixed order required under the standard. For instance, an H.263 frame sequence could take the form of:

| 1 | 2 | 3 | 4, 5 | 6 | 7 | 8, 9 | 10 |
|---|---|---|------|---|---|------|----|
| I | P | P | PB   | P | P | PB   | P  | wherein frame 1 is an I frame, frames 2, 3, 6, 7 and 10 are P frames and the frames 4,5 and 8,9 are each encoded as a PB frame.

H.263 is a hybrid motion-compensated coder based on half pixel accuracy motion estimation wherein each motion vector is encoded differentially (i.e. only the difference between the current motion vector and its prediction is transmitted) using a prediction window of three motion vectors of the surrounding macro-blocks, as shown in FIG. 4. This is in contrast to H.261 where the motion estimation uses full pixel accuracy and the motion vector of the previous macro-block in the same row is used as the prediction for encoding the motion vector of the current MB.

In FIGS. 4–7, MV is the motion vector for the current MB, MV1 is the motion vector of the previous MB in the sequence, MV2 is the motion vector of the above MB, and MV3 is the motion vector of the above right motion vector. The dotted lines in FIGS. 4–7 indicate a picture or GOB border which affect the motion vectors used to encode the current motion vector MV.

Note that in H.263, the motion vectors of the first slice of each GOB are effectively encoded in a fashion similar to H.261 using the adjacent MB as the predictor reference. As a result, if each GOB is limited to containing only one slice of information; then no information from the previous slice is needed to decode this GOB. H.263 also allows optional extended motion vectors, overlapped motion estimation, four motion vectors per each MB and the addition of PB frames (wherein each PB frame consists of a prediction block P and a bidirectional interpolation prediction block B). Using these options increases the efficiency of the coder but also adds to its complexity. Studies have shown, however, that the greatest performance gain over H.261 is obtained using half-pixel instead of full-pixel motion estimation.

Another advantage to the assumption that each GOB contains one slice of a picture is that one packet can be used to packetize each GOB and, thus, it is not necessary to pad any additional information from any previous slices into a packet header. This solution is, in fact, proposed as one of the transmission modes (Mode A) for the RTP payload format of H.263 video stream, as described in "RTP Payload Format for H.263 Video Stream", Internet Engineering Task Force (IETF), Internet draft, June 1996. Modes B and C of the RTP payload format allow for fragmentation at the MB boundaries but require considerably more overhead which can be prohibitively high at low bit-rate levels. By comparison, Mode A has eight bytes of overhead per packet whereas Mode B and C have twelve and sixteen bytes, respectively, of which four bytes is the RTP overhead and the rest is the H.263 payload overhead.

Another advantage of Mode A is that it also provides an easy error recovery method since the picture and the GOB header can be easily identified at the beginning of each packet payload. The main disadvantage of Mode A is its inflexibility with respect to the network packet size—the bits generated for each GOB should be smaller than the packet size. This problem, however, can be overcome in most circumstances by using a proper transmission rate allocation mechanism. Another alternative is to permit the use of variable RTP packet sizes or use Mode B to transmit the second packet in a series. However, the basic assumption that each transmitted packet contains no more than one slice of a picture means that the effect of a lost packet is limited to the loss of a single picture slice.

B. Error Recovery Methods

Error recovery methods fall into two general categories. These categories are open-loop and closed-loop. In closed-loop methods, a back channel from the receiver to the transmitter is maintained whereby the receiver conveys the status of the transmitted information back to the transmitter. This information can be as simple as a single bit indicating whether a packet is correctly received or it can contain more detailed information. It is then up to the transmitter to process this information and take an appropriate action. An example of a closed-loop method is the Automatic Recovery request (ARQ) recovery scheme wherein lost packets are retransmitted. See M. Khansari, A Jalali, E. Dubois and P. Mermelstien, "Low Bit-rate Video Transmission Over Fading Channels for Wireless Microcellular Systems," IEEE Transaction on CAS for Video Technology, pp. 1–11, Feb. 1996.

Alternatively, instead of retransmitting the packet, the transmitter can try to contain the effect of packet losses by adapting the subsequent encoding of the source image. E. Steinbach, N. Farber and B. Girod propose a method in "Standard Compatible Extension of H.263 for Robust Video Transmission in Mobile Environment", to appear in IEEE Transactions on CAS for Video Technology, wherein the encoder, upon receiving a negative acknowledgement of a packet, will not encode subsequent blocks in the using any further reference to the lost segments of the packet thereby containing the error propagation due to the faulty packet.

Another proposed error resilient strategy is the use of a feedback channel in the ISO MPEG-4 standard. See the report "Description of Error Resilient Core Experiments", Ad-hoc group on core experiments on error resilience aspects in MPEG-4 video, ISO/IEC JTC1/SC29/WG11 N1587 MPEG97, Mar. 31, 1997. Under this strategy, the receiver sends information regarding the status of an entire picture frame over the feedback channel.

The fundamental parameter in all closed-loop systems is the round trip delay. When this delay is small, the information provided to the transmitter by the receiver is more current and is therefore of greater relevance. When the round trip delay is too long or there are practical constraints to maintaining a back channel, open-loop error recovery methods must be considered instead.

In open-loop methods, the recovery from channel errors is the responsibility of the receiver. In the case of Forward Error Correction (FEC), the transmitter adds redundant parity bits which can be used to recover, to some extent, the information lost due to the channel error. In general, the input to the channel encoder is a binary stream generated by the source encoder and the channel encoder does not distinguish among different segments of the input binary stream. Using Unequal Error Protection (UEP) the amount of the protection is based upon the importance of the information where more important information (e.g. motion vectors in hybrid coders) is protected using more resilient channel codes. In this case, the source encoder should generate multiple streams which may not be practical.

Another open-loop system is Error Concealment (EC) wherein the source decoder tries to reconstruct the lost data using the information available at the same frame or a previously decoded frame. One EC scheme, that is particularly popular for motion compensation based coders, is to replace the lost pixels with pixels from the same location in the previous picture frame. This relatively simple method is effective in most situations but not when there is a high amount of motion and activity in the scene. Also, for a hybrid coder where temporal prediction is used, the sequence reconstructed at the transmitter will not be exactly the same as the sequence reconstructed at the transmitter. This results in error propagation along the temporal dimension and is known as drift phenomenon. This error propagation tends to be persistent and the loss of even one GOB can affect many subsequent frames.

Accordingly, a need remains for an open-loop error correction method for a block-based coding method, such as MPEG, JPEG and H.263 video coding, which has low overhead and limits error propagation.

SUMMARY OF THE INVENTION

It is, therefore, an object of the invention to provide a low-complexity error resilience method which is compatible with the H.263 standard.

Another object of the invention is to provide an error correction method which corrects one slice of lost information exactly or partially.

A further object of the invention is to provide an error correction method which is suited to packet networks such as the internet where the majority of data errors are due to lost packets.

An embodiment of a method for transferring video data, according to the present invention, includes receiving video data for a picture, subdividing the video data into blocks, transforming the blocks of video data into blocks of residual data, quantizing the blocks of residual data, and comparing the video data for the picture with stored video data for a previous picture in order to generate motion vector data. The method also calls for organizing the blocks of residual data into a plurality of macroblocks (MBs) and organizing the plurality of MBs into groups of blocks (GOBs), wherein each GOB corresponds to a slice of the picture and the motion vector data in each GOB is independent of any other GOBs. The method also involves constructing an erasure slice comprised of another GOB, wherein the GOB of the erasure slice is further comprised of another plurality of MBs, and wherein each one of the plurality of MBs of the erasure slice corresponds to one of the plurality of MBs in each GOB of the picture data. The method also includes encoding each one of the GOBs of the picture data and the erasure slice into a block-based coding standard compliant packet and transmitting each standard compliant packet.

An embodiment of a block-based coding standard compliant encoder according to the present invention includes a subtractor configured to subtract a reference signal from a video data signal corresponding to a picture in order to produce a difference signal, a transformer configured to transform the difference signal into residual data, and a quantizer configured to quantize the residual data received from the transformer responsive to a QUANT signal received in order to produce quantized data. The encoder further includes a variable length encoder and multiplexor which receives INTER/INTRA, PTYPE and QUANT signals and motion vector data and which encodes the quantized data to form block-based coding standard compliant data packets which include the INTER/INTRA, PTYPE and QUANT signals and the motion vector data and wherein each group of blocks of the standard compliant data packets corresponds to a slice of picture data. A buffer receives and stores the standard compliant data packets formed by the variable length encoder and multiplexor. An erasure slice constructor receives the standard compliant data packets stored in the buffer and, responsive thereto, generates an erasure slice corresponding to the picture from which one of the standard compliant data packets can be reconstructed from the remaining standard compliant data packets for the picture and the erasure slice for the picture.

An embodiment of a block-based coding standard compliant decoder according to the present invention includes an input buffer which receives and stores standard compliant data packets corresponding to a picture along with an erasure slice corresponding to the picture. A variable length decoder and demultiplexor receives and decodes the standard compliant data packets and outputs quantized data decoded from the standard data packets at an output terminal and extracts an INTER/INTRA signal, a PTYPE signal, a QUANT signal and motion vector data from the standard data packets. The variable length decoder and demultiplexor also extracts and outputs group of blocks header information from the standard data packets. An inverse quantizer inverse-quantizes the quantized data received from the variable length decoder and demultiplexor responsive to the QUANT signal in order to produce residual data. An inverse transformer inverse transforms the residual data into a difference signal. A motion compensation predictor receives the INTER/INTRA and PTYPE signals and the motion vector data and, responsive thereto, generates a reference signal. An adder receives the reference signal and the difference signal and, responsive thereto, generates a video signal corresponding to the picture. An erasure slice reconstructor also receives the standard data packets and the erasure slice stored in the buffer, as well as the group of blocks header information and, responsive thereto, determines whether there is a lost standard data packet and reconstructs the lost packet from the remaining standard data packets for the picture and the erasure slice for the picture.

An advantage of the present method is that it is simple and does not require additional hardware or software to decode the overhead information, since the erasure slice conforms to the bitstream syntax of the coding method.

Another advantage of the present method is that the amount of overhead and delay generated to reconstruct lost information is minimal.

Yet another advantage of the present method is that it permits bits to be easily traded between source data and protection data which allows for a simple adaptation of the bit allocation to the current status of the transmission channel.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 2A is a diagram illustrating a series of pictures forming a video sequence.

FIG. 2B is a diagram illustrating a picture from FIG. 2A which is divided into slices.

FIG. 2C is a diagram illustrating a slice from the picture of FIG. 2B which is composed of a series of macroblocks and the organization of macroblocks into groups of blocks.

FIG. 2D is a diagram illustrating the luminance and chrominance blocks which make up one of the macroblocks from the slice of FIG. 2C.

FIG. 2E is a diagram illustrating an 8×8 pixel block such as the luminance and chrominance blocks of the macroblock of FIG. 2D.

FIG. 3 is a diagram illustrating the relationship between non-predictive and predictive pictures in a video sequence.

FIGS. 4–7 are block diagrams illustrating the relationship between the motion vector of a macroblock being encoded using motion compensation to the motion vectors of adjacent macroblocks.

DETAILED DESCRIPTION

The present invention is directed toward an open-loop error recovery mechanism for video data coded using a block-based coding standard. Similar to FEC, redundant information is added to the bit stream. But, unlike FEC, the redundant information is added during the compression stage and not after. It is therefore possible to adaptively reallocate the number of bits allocated to redundant parity information with a high level of granularity in a manner which is more simple than reallocation in a system using FEC. Also, it is possible, with the present invention, to add enough parity information to perform lossless reconstruction of the lost data. Another feature of the present invention is that unequal error protection (UEP) can be performed through bit reallocation. The amount of overhead introduced to the bit stream by the present invention is minimal (i.e. approximately 10 to 20 percent for a given number of picture-frames).

Figure 1A:
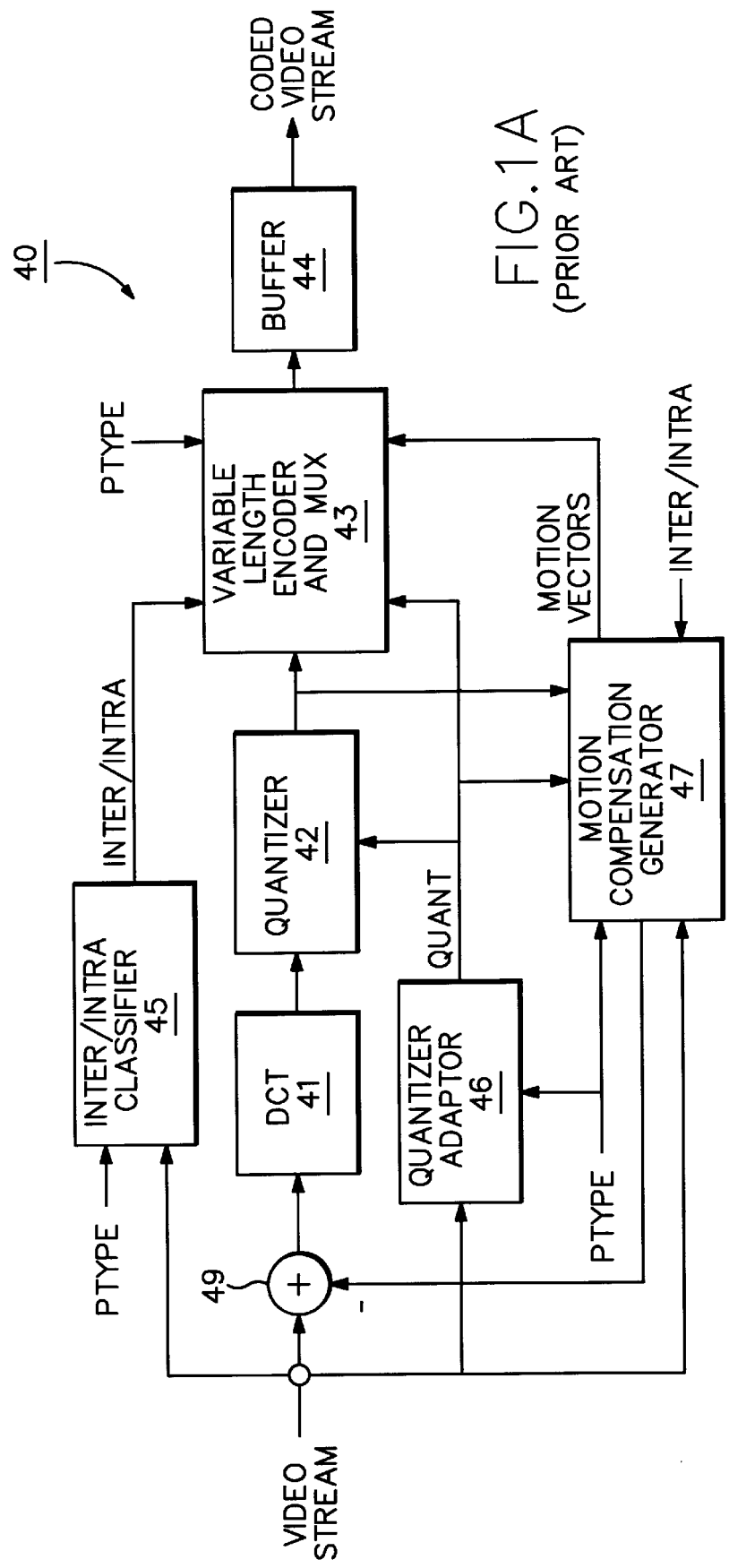
FIG. 1A is a functional block diagram of an embodiment of a conventional encoder.
Figure 1B:
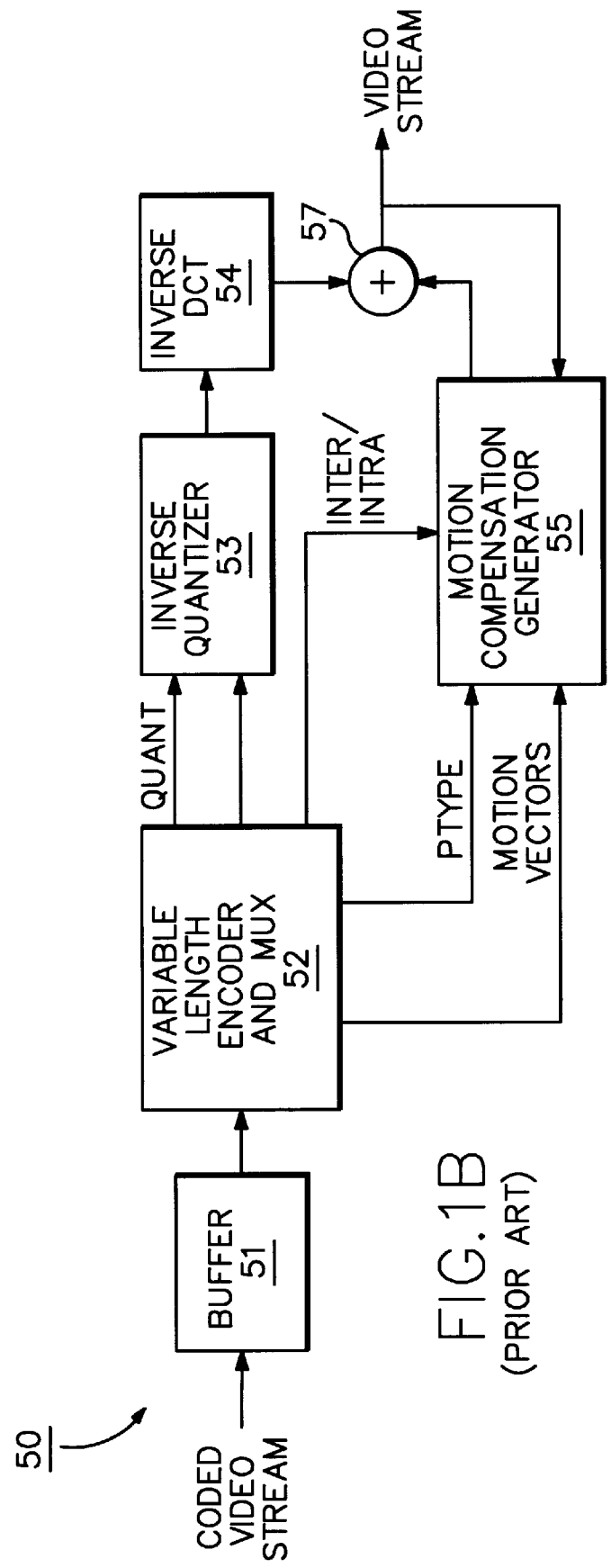
FIG. 1B is a functional block diagram of an embodiment of a conventional decoder.
Figure 8:
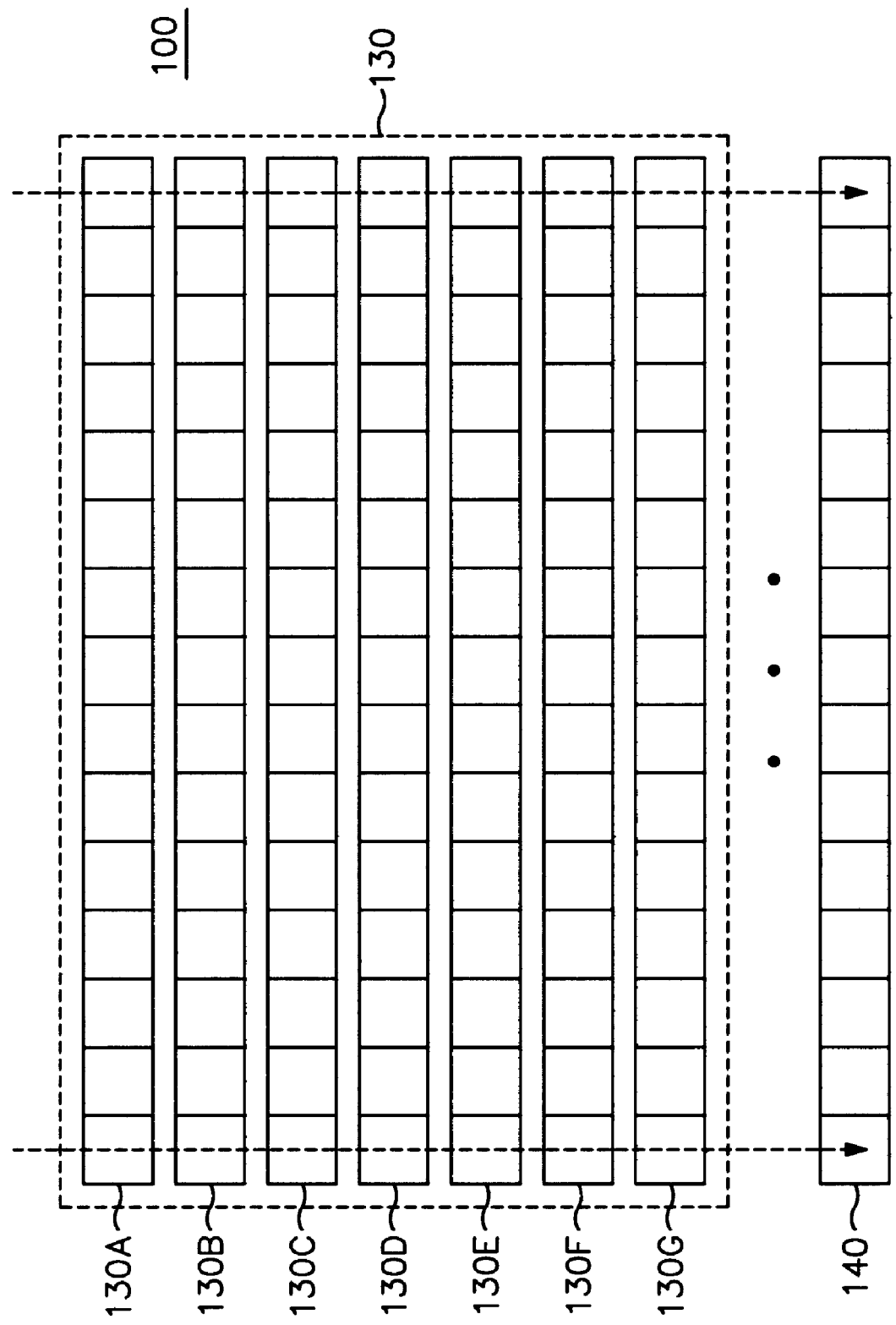
FIG. 8 is a diagram illustrating the relation of the erasure slice of the present invention to the slices of a picture.

Since each slice is packetized independently of other slices, loss of a single packet results in the loss of no more than one slice of information. The present invention permits the complete or partial reconstruction of the lost packet by constructing an additional slice called an erasure slice 140, as illustrated in FIG. 8. The erasure slice 140 is coded using standard H.263 and is thus the resulting bit stream is a valid H.263 bit stream which can be decoded using H.263 compliant hardware and software. Each GOB header includes a field containing a GOB number which is used to distinguish the erasure slice from the GOBs containing picture data.

If the amount of motion within a scene having a lost GOB is low, then copying the lost GOB from the previous picture is satisfactory for reconstruction of the lost data. It is therefore necessary to have a mechanism for determining the activity level of individual pictures. In the present invention, an activity parameter for a frame which reflects the level of activity in the frame is obtained by summing the motion vectors within that frame. Equation (1) below is an example of a method for obtaining the activity parameter of a frame, where $MV_x(i,j)$ and $MV_y(i,j)$ are the x and y motion vector components of the jth MB of the ith slice of the frame.

$$\text{activity} = \sum_i \sum_j (|MV_x(i,j)| + |MV_y(i,j)|) \quad (1)$$

Redundant information is only transmitted when the activity parameter for a frame is greater than a predefined activity threshold parameter ACTH. Note that ACTH can be changed dynamically in order to vary the number of bits required to encode the motion vectors. An ACTH value of 300 translates to approximately 1.5 pixels on average for each component of the motion vector. Thus, if activity is less than ACTH, then the picture has a low degree of motion and, if a GOB is lost, then it can be adequately reconstructed by copying it from the previous frame in the sequence.

Another method for determining the activity level of a frame is based upon examining the energy of the residual signal, i.e. DCT coefficients, for the frame. However, the residual signal can be misleading when low transmission bit rates are used with coarse quantization levels.

The information in each MB can be classified into two categories. The first category is information specifying the parameters used in decoding the residual information and the second is the residual information itself, i.e. DCT coefficients. Examples of the first category of information are motion vectors, quantization parameters and the frame type of the macro-block (I, P or PB). Any loss of information in the first category can have catastrophic consequences and special care is needed to protect this information. In the present invention, the strategy is to reconstruct the first category of information losslessly when a MB is lost while the residual information is reconstructed with a level of loss determined by the available transmission bit-rate budget.

Each MB of the erasure slice 140 is constructed using MBs of the other slices located in the same column. As illustrated in FIG. 8, an erasure slice 140 is formed from a series of slices 130A–G of a picture 130. Each macroblock of erasure slice 140 is formed by summing the macroblocks in the corresponding column of slices 130A–G. The dotted arrows in the first and last columns of picture 130 illustrate that the MBs in the first and last columns, respectively, are summed to form the first and last MBs of the erasure block. The ellipses between the picture data 130 and the erasure slice 140 indicate that this process is performed for each MB of the erasure slice. The formation of the components of each of the MBs of erasure slice 140 is discussed in further detail below.

A. DCT Residual Information

The residual information for the erasure slice is determined by summing the residual information of all the MBs in the same column. Note that this sum can be taken either before or after quantization of the source image. The present embodiment sums the quantization output. The coefficients resulting from the summation are then divided by a predetermined factor known to both the receiver and transmitter in order to limit the dynamic range of the coefficients and lower the resulting bit rate. Empirical study indicates that a factor of two represents a good trade-off between bit-rate and dynamic range.

In addition, hard thresholding is used to set any DCT coefficient having an absolute value less than a predetermined threshold T to zero. This results in longer runs of zeros in the bit stream and, through run-length encoding, lowers the number of the bits generated by the addition of the erasure slice.

Furthermore, the value of the threshold T and the activity threshold ACTH can each be modified in order to control the number of bits generated by the addition of the erasure slice 140. When one of the packets containing picture information is lost, then it is possible to partially reconstruct the lost information using the erasure slice. A threshold value of zero for T and a division factor of one results in an exact or lossless reconstruction of the lost packet information, but at the cost of a greater number of bits being generated by the addition of the erasure slice.

The ACTH and T parameters can be calculated from one frame to the next. This requires a multiple-pass algorithm which is possible if a delay is allowed which permits the multiple-pass algorithm to be executed. Rate allocation is typically done using a buffer of three or more picture frames.

B. Motion Vectors

As was stated above, any loss of information in the motion estimation information can lead to extensive error propagation in the decoded picture frame sequence. The present invention therefore linearly combines the motion vector data of the picture frames in order to generate the erasure slice. Equation (2) is an example of a modulo summation technique used to generate the motion vector field of the erasure slice. Each component of the motion vectors $MV_x((i,j)$ and $MV_y(i,j)$ is in the range [−16, 15.5]. Equation (2) is then used to determine the value of $MVE_x(i)$ which is the x component of ith MB of the erasure slice 140.

$$MVE_x(i) = \sum_j MV_x(i,j) \quad (2)$$

The summation in equation (2) is modulo summation in order to ensure that the resulting value of the summation remains in the range [−16, 15.5]. The value of $MVE_y(i)$ is similarly found. It is therefore possible to encode $MVE_x(i)$ and $MVE_y(i)$ using the same variable-length code (VLC) table for MVD provided under the H.263 standard.

Note that if one of the (i+1) slices of the picture is lost, then all the motion vectors of the MBs of the lost slice can be reconstructed at the decoder using the information available in the erasure slice 140. The motion vectors of the lost slice can be obtained at the decoder by performing modulo subtraction of the remaining slices from the erasure slice.

C. Quantization and Picture-Type (PTYPE) Parameters

The value of the quantization difference parameter DQUANT for each macro-block of the erasure slice 140 is determined in a similar lossless fashion. The DQUANT parameter is in the range [−2, 2] and modulo summation is used to ensure that the value always remains within this range. Note that if the macroblock type of any of the MBs in the same column is INTER+Q, meaning the quantization parameter GQUANT for the MB is modified through DQUANT, then the macroblock type of the corresponding MB in the erasure slice 140 is also set to INTER+Q. In other words, the macroblock type of a MB in the erasure slice 140 is INTER only if all the MBs in that column are of the INTER type. The use of INTRA type MBs is restricted to intra-frame pictures.

As described above, the macroblock type MTYPE of a MB is related to the PTYPE. Within an I frame, all the MTYPE values are I (i.e. INTRA or INTRA+Q), but within a P-frame it is possible to have MTYPEs of either I or P (i.e. INTER, INTER+Q or INTER4V). The MTYPE of the erasure block MB should be I only if the MTYPE of all MBs in the corresponding column are also I. In the present embodiment, the MTYPE value for each MB in a P-frame are forced to be INTER or INTER+Q. The resulting bitstream will nonetheless be standard compliant.

D. Process Flow

Figure 9:
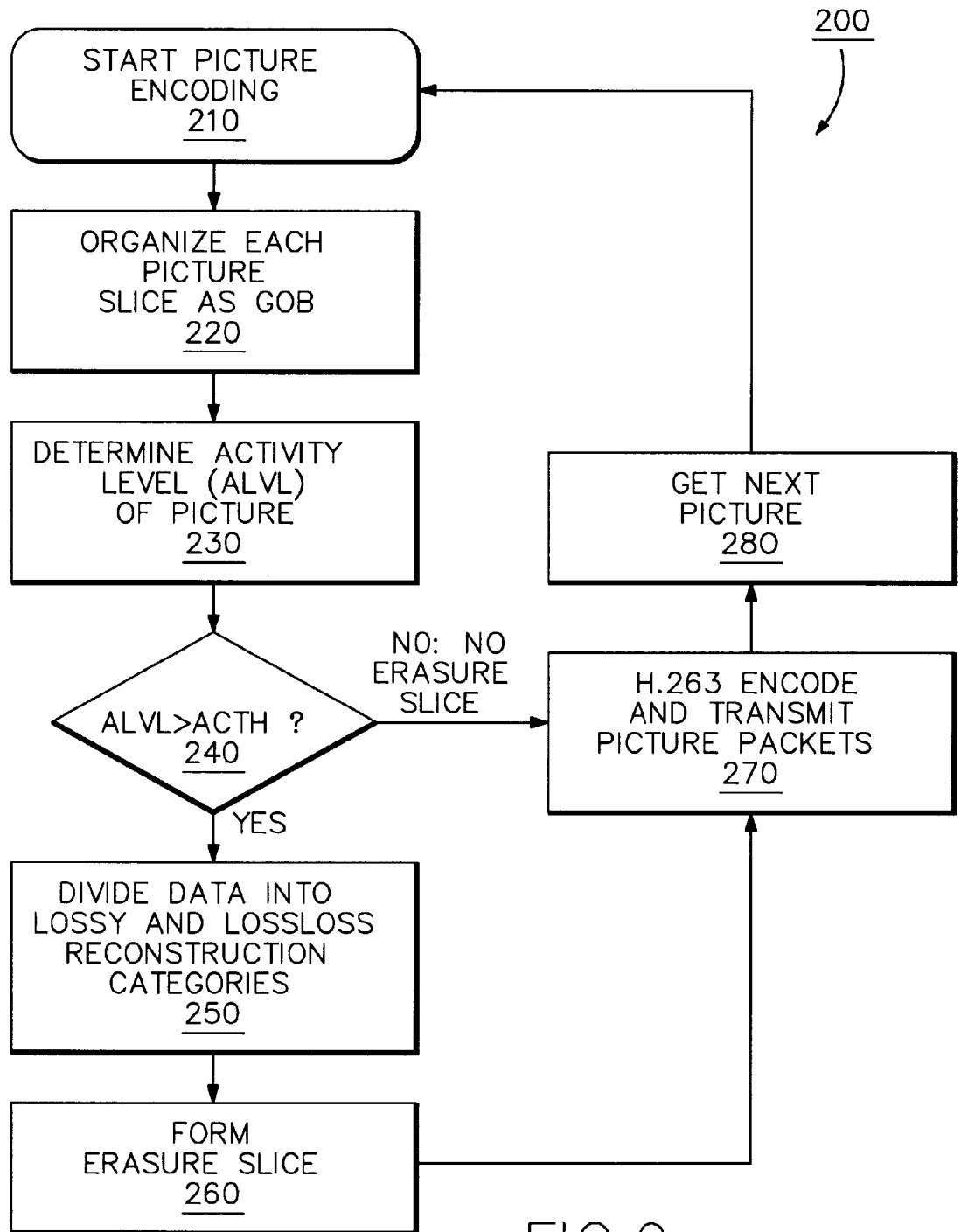
FIG. 9 is a flow diagram illustrating the process of encoding picture data according to the present invention.

FIG. 9 illustrates the steps involved in the method 200 of the present invention. At the START PICTURE ENCODING step 210, a picture in a video sequence is selected for encoding and the source image data of the picture is quantized and transformed into macroblocks MBs. The picture is divided into slices. At this point of the process, compression using spatial or INTRA-picture methods or transformation, such as transforming the source data into DCT coefficients, can be applied to the picture image data. (Inter-picture encoding is also performed using DCT and quantization, but this involves the difference signal between a source image frame and a reference frame.) The slices of the picture are then organized into GOBs 220 before temporal or inter-picture compression techniques are applied to the image data.

The activity level ALVL of the picture is then determined 230. The activity level can be calculated by any method which results in a parameter which reflects the activity level in the picture. The preferred method of the present invention is to use equation (1) above. However, it is also possible to use other measures, such as the DCT residual information, as set forth above. Another alternative is to determine the activity level prior to quantization of the picture source image data.

The activity level ALVL is then compared to the activity threshold ACTH 240 in order to determine whether or not to generate an ERASURE slice for the picture. If the activity level ALVL of the picture under consideration is not above the threshold ACTH, then no erasure slice is produced for the picture and processing can proceed on to transmit picture packets 270. If the activity level ALVL is greater than ACTH, then processing moves to the steps for generating the ERASURE slice for the picture.

The first step in producing the erasure slice is to divide the picture data into lossy and lossless reconstruction categories 250. Included in this step is consideration of the level of bit-allocation between the lossy and lossless categories for UEP techniques. As discussed above, data which has a great effect on decoding, such as motion vectors, quantization parameters and block type, should generally be categorized for lossless reconstruction. The number of bits allocated to data categorized for lossy reconstruction, such as DCT coefficients, can be adjusted based upon the amount of transmission bandwidth available in the communications channel from the encoder to the decoder. Processing then proceeds on to form the ERASURE slice for the picture 260 which is discussed in greater detail below with regard to FIG. 10.

Once the ERASURE slice is formed in step 260 or it is determined that the activity level of the picture is below the threshold ACTH, then processing proceeds to H.263 encoding and transmission of picture packets 270. This step involves forming and transmitting H.263 compliant packets containing the processed image data for the picture from the encoder to the decoder on the communication channel between them. The H.263 standard is structured to include run-length encoding and variable length encoding in order to obtain substantial compression of the video bit stream. For instance, the MB layer for H.263 includes a variable LAST with each transform coefficient of a given block which indicates whether there are any more non-zero coefficients in the block. Therefore, extending the zero run-lengths results in greater compression within H.263.

Figure 10:
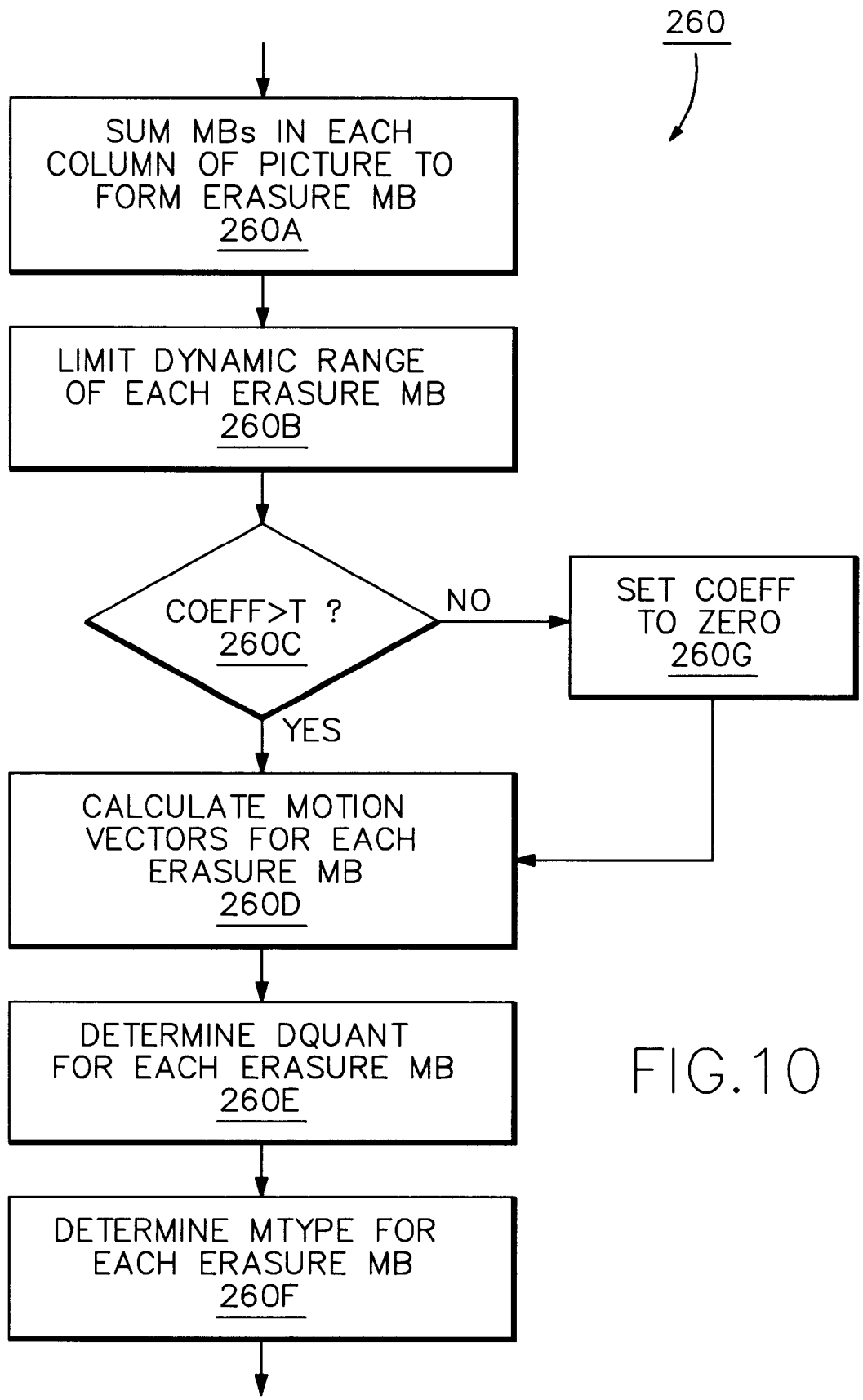
FIG. 10 is a flow diagram illustrating in greater detail the steps associated with the step of forming the erasure slice of FIG. 9.

FIG. 10 outlines the steps for formation of the erasure slice 260. To obtain the coefficient values for the ERASURE slice, the DCT info for each MB in the column corresponding to the MB of the ERASURE slice is summed 260A. This step can be performed either prior to quantization or after quantization. The preferred method is to sum the residual information after the quantization performed in the start picture encoding step 210 of FIG. 9.

The dynamic range of the erasure slice is then limited in step 260B. This can be achieved by dividing the sum obtained in step 260A by a predetermined factor. The preferred factor derived from empirical observations is two, as described above.

The threshold T is then compared to each coefficient COEFF of the ERASURE slice 260C. Coefficients that are not greater than T are set to zero 260G in order to increase zero run lengths.

The motion vectors for each erasure MB are then calculated 260D. The preferred method for forming the motion vectors employs equation (2) above. The value of DQUANT for each MB is determined 260E as described above. And the value of MTYPE for each MB is determined 260F as described above.

Figure 11:
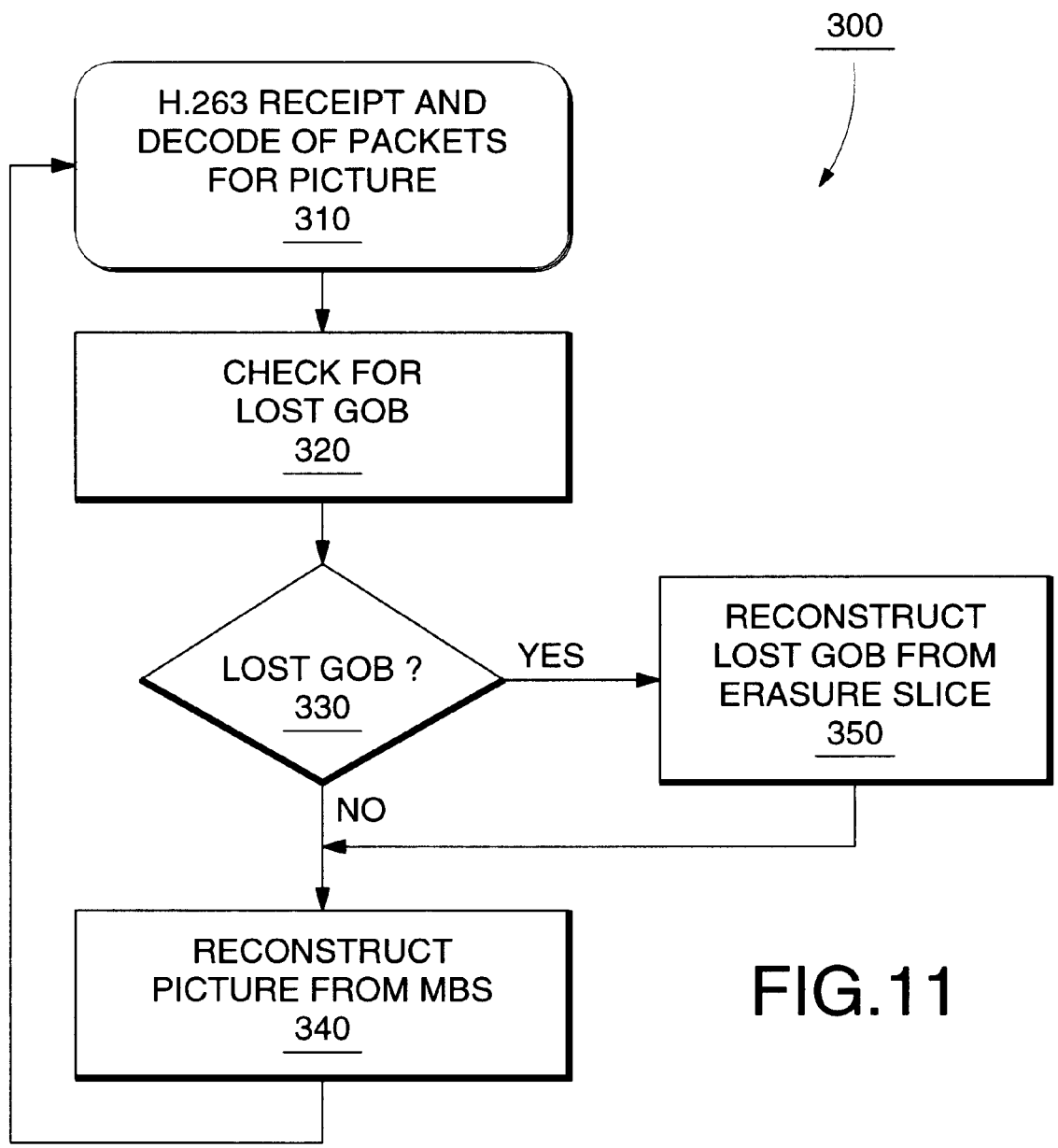
FIG. 11 is flow diagram illustrating the process of decoding picture data according to the present invention.

The process 300 at the decoder is illustrated in the flow diagram of FIG. 11. The H.263 packets for the encoded picture are received and decoded into GOBs 310. This function can be performed by a standard H.263 decoder because the ERASURE slice, as well as the other picture data, are H.263 compliant packets.

The picture data is then checked for lost GOBs 320. The GOB layer header information will indicate whether there is a missing GOB. If there is a missing GOB 330, then the ERASURE slice will be used to reconstruct the lost GOB 350, which is discussed in further detail below.

If no GOB is lost or the lost GOB is reconstructed in step 350, then the picture is reconstructed from the received MBs 340 in the same manner as a conventional picture sent without the ERASURE slice of the present invention, wherein the received picture data is motion-compensated, inverse transformed and inverse quantized, etc.

Figure 12:
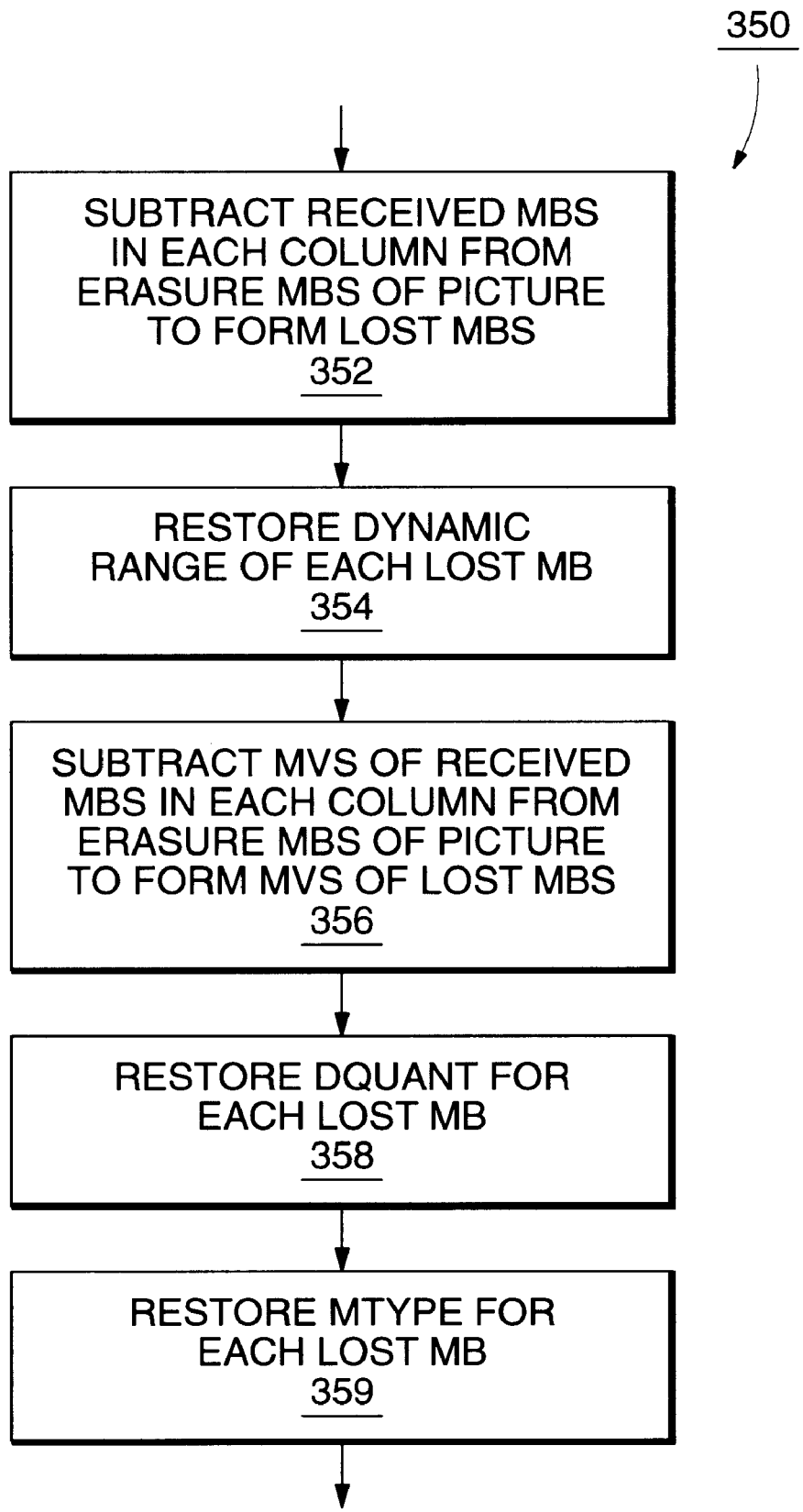
FIG. 12 is flow diagram illustrating in greater detail the steps associated with step of reconstructing a lost GOB from an erasure slice of FIG. 11.

FIG. 12 sets forth in greater detail the functions that take place to reconstruct a lost GOB from the ERASURE slice 350. This process is essentially the inverse of the ERASURE slice formation step 260. To obtain the coefficient values for the MBs of the lost GOB from the MBs of the ERASURE slice, the DCT information of each of the validly received MBs in the column corresponding to the MB of the ERASURE slice is modularly subtracted from the MB of the ERASURE slice 352. The dynamic range of the lost MB is restored 354 by multiplying the restored coefficient values by the predetermined factor which is also predetermined in the decoder.

The motion vectors are also restored by modulo subtraction of the MVs of each of the validly received MBs in the same column from the MV of the corresponding MB in the ERASURE slice 356. DQUANT is restored 358 by modulo subtraction of the DQUANT values of the received MBs in a given column from the DQUANT value of the corresponding MB of the ERASURE slice. MTYPE for the lost MB is restored 359 by setting it to the MTYPE of the corresponding MB of the ERASURE slice.

E. System Structure

Figure 13:
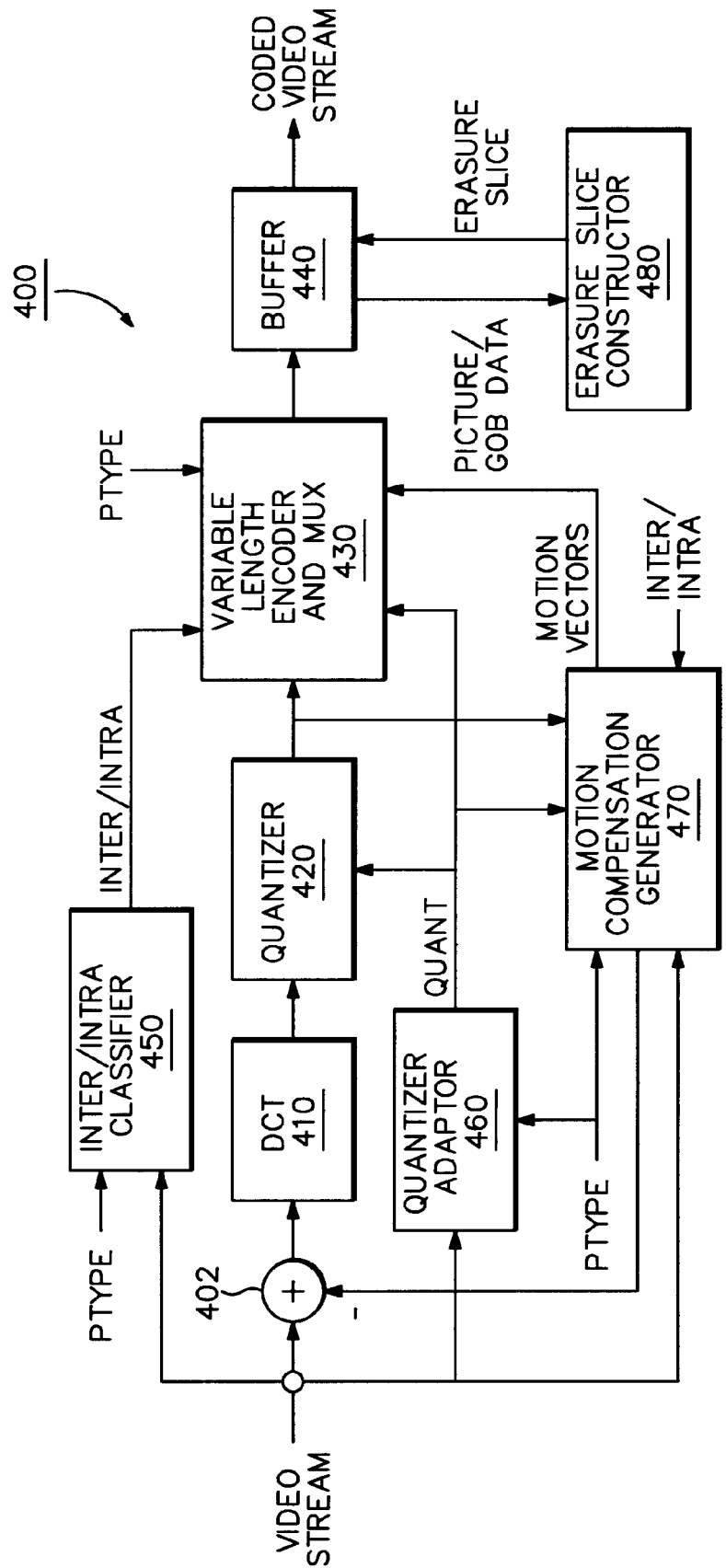
FIG. 13 is a functional block diagram of an embodiment of an encoder according to the present invention.

FIG. 13 is a functional block diagram which illustrates an embodiment of an encoder 400 according to the present invention. An incoming video stream passes through subtractor 402 to DCT 410 which transforms the input pixel data in DCT residual data that is output to quantizer 420. The incoming video stream is also input to inter/intra classifier 450 and quantizer adaptor 460. Inter/intra classifier 450 also receives a PTYPE signal and, based upon the incoming video stream and PTYPE, determines the value of the INTER/INTRA signal. Quantizer adaptor 460 observes the incoming video stream and determines the quantization signal QUANT.

The incoming video stream, the output of quantizer 420, the PTYPE signal and the INTER/INTRA signal are input to motion compensation generator 470 which compares past pictures to the present picture data in order to generate MOTION VECTORS for temporal compression of the picture data. The motion compensation generator 470 also generates a subtraction picture signal which is input to subtractor 402.

Variable length encoder and multiplexor (MUX) 430 receives the output of quantizer 420, the PTYPE signal, the INTER/INTRA signal and the motion vectors in order to generate the GOBs for a picture which are then stored in buffer 440 for output as a coded video stream. The PICTURE/GOB DATA stored in buffer 440 is used by erasure slice constructor 480 to construct the ERASURE SLICE for the picture, in the manner described above, and the ERASURE SLICE is stored back in buffer 440 for inclusion in the coded video stream.

Figure 14:
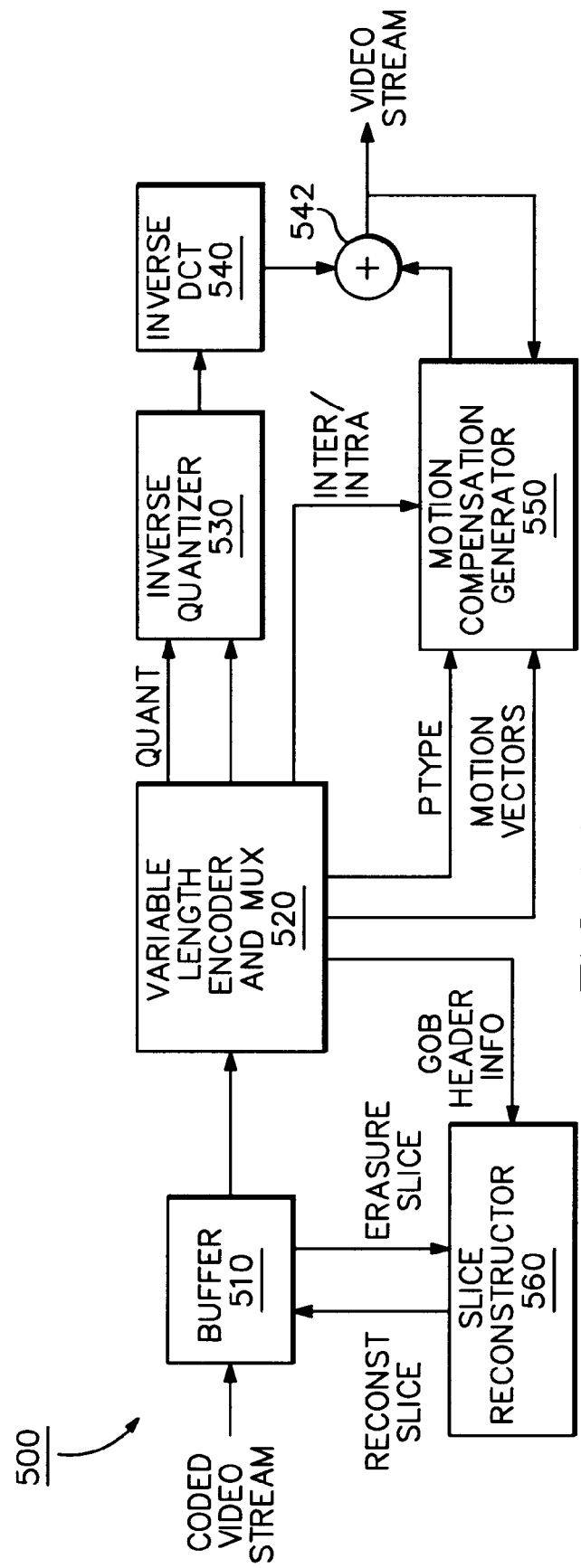
FIG. 14 is a functional block diagram of an embodiment of a decoder according to the present invention.

FIG. 14 is a functional block diagram illustrating an embodiment of a decoder 500 according to the present invention. The coded video stream generated by the encoder 400 of FIG. 13 is received and stored in buffer 510. Variable length decoder and demultiplexor (DMUX) 520 decodes the H.263 data in buffer 510 and extracts the QUANT signal, INTER/INTRA signal, PTYPE signal and MOTION VECTORS as well as the picture data and the GOB HEADER INFO from the H.263 data.

The slice reconstructor 560 examines the GOB HEADER INFO in order to determine whether a GOB of the picture has been lost. If a GOB has been lost, slice reconstructor 560 uses the ERASURE SLICE received with the coded video stream for the picture and reconstructs the lost slice RECONST SLICE, in the manner described above, which is stored back in buffer 510 for decoding with the rest of the picture data.

Inverse quantizer 530 receives the QUANT and INTER/INTRA signals which control the inverse quantization of the picture data decoded by variable length decoder and DMUX 520. The inverse quantized data output by inverse quantizer 530 is input to inverse DCT 540 which inverse transforms the picture data for output to adder 542. Motion compensation predictor 550 receives the PTYPE signal and MOTION VECTORS from variable length decoder and DMUX 520 as well as the decoded video stream output from adder 542 in order to produce motion compensated picture data which is input to adder 542 to reconstruct the original picture.

F. Performance

Figure 15:
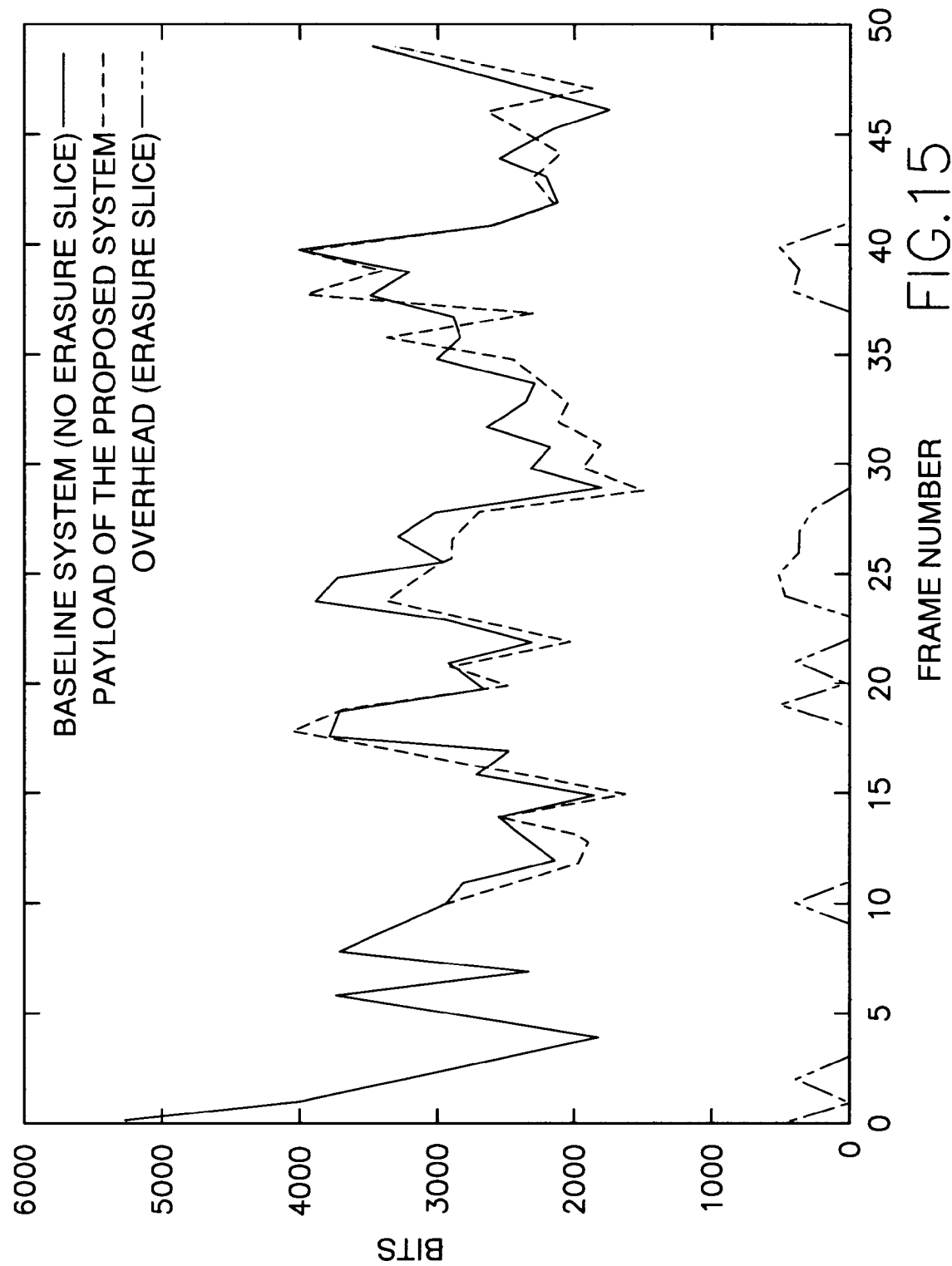
FIG. 15 is a graph illustrating the number of bits generated for a given frame sequence by a baseline system as compared to an embodiment of an encoder according to the present invention.
Figure 16:
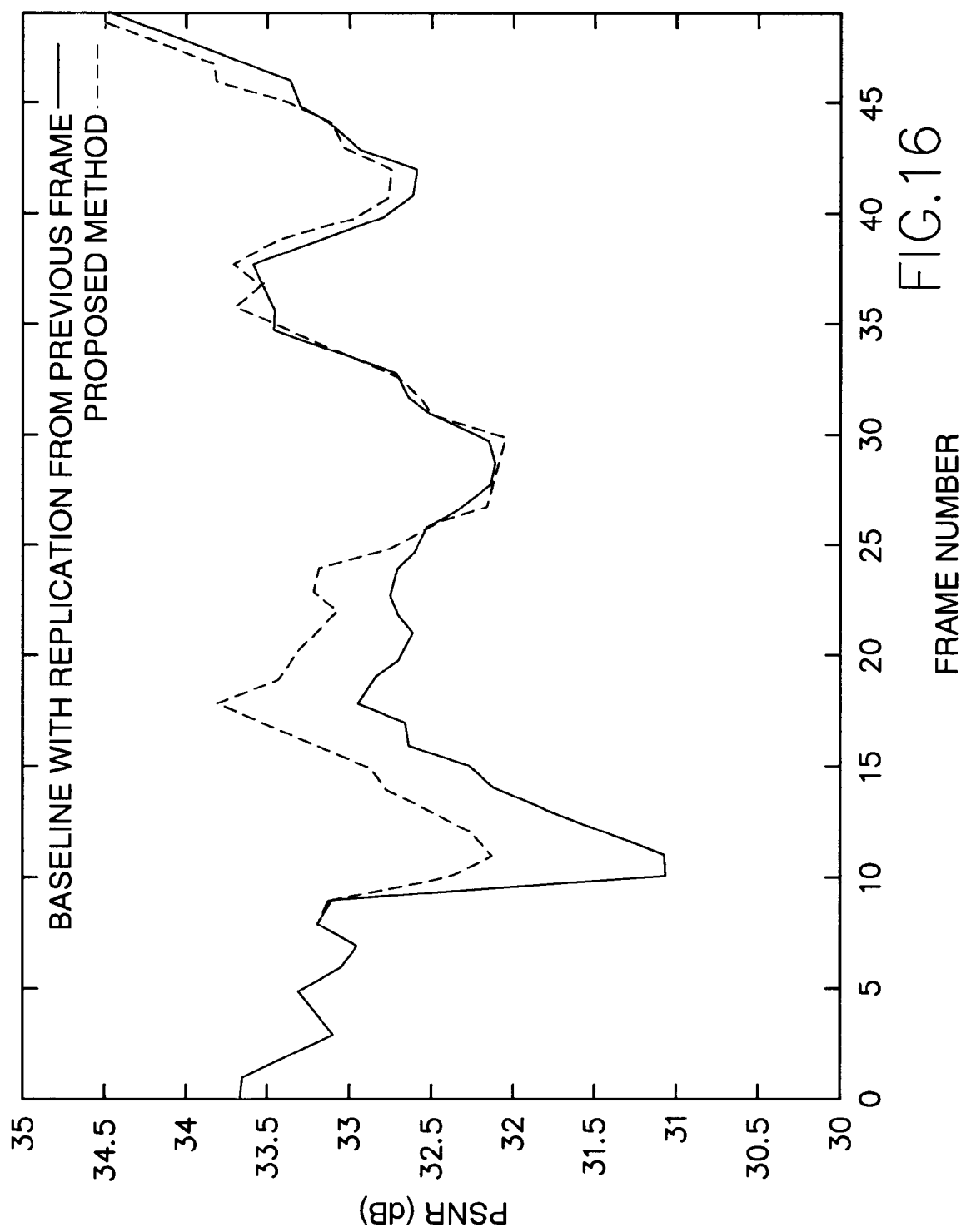
FIG. 16 is a graph illustrating the signal to noise ratio produced for a given frame sequence by a baseline system as compared to an embodiment of the present invention.

FIGS. 15 and 16 are graphs illustrating the performance of the present invention. FIG. 15 shows the number of bits generated for a picture sequence when the erasure slice of the present invention is generated, shown by the dashed line, as compared to the bits generated by a baseline coder for the same bit sequence, as shown in the solid line. Also shown as a dotted line in FIG. 15 is the overhead introduced by the inclusion of the erasure slice. The bit-rate graph including the erasure slice of the present invention reflects an activity threshold of 300 which results in a level of overhead that is between 10% and 15% of the total bit budget.

FIG. 16 shows the PSNR performance of the present invention, shown by the dashed line, as compared to the baseline coder, shown by the solid line, when the fifth GOB of frame number 10 of a video sequence is lost. The error concealment method employed by the baseline coder in the graph is to replace the lost GOB by the GOB at the same spatial location in the previous frame. Note that for the frame with the lost GOB, the PSNR performance of the present invention is approximately 1.5 dB better than that of the baseline coder and continues to be better for a relatively long period of time, about 1.5 seconds or 15 frames, after the occurrence of the lost GOB. FIG. 15 illustrates that for motion-compensated based hybrid coders, such as H.263, the relatively persistent effects of transmission losses are effectively reduced by the present invention.

Having described and illustrated the principles of the invention in a preferred embodiment thereof, it should be apparent that the invention can be modified in arrangement and detail without departing from such principles. For instance, while the embodiment described above is directed toward an H.263 compliant method and system, it should be apparent to one skilled in the art that the present invention can be applied to any block based coding method, such as JPEG and MPEG. In addition, though the invention is discussed above in the context of a single erasure slice capable of recovering a single lost slice, the invention can be extended to include multiple erasure slices which can recover multiple lost slices. I claim all modifications and variations coming within the spirit and scope of the following claims.

What is claimed is:

1. A method for transferring video data, the method comprising the steps:

receiving video data for a picture;

subdividing the video data into blocks;

transforming the blocks of video data into blocks of residual data;

quantizing the blocks of residual data;

comparing the video data for the picture with stored video data for a previous picture in order to generate motion vector data;

organizing the blocks of residual data into a plurality of macroblocks (MBs);

organizing the plurality of MBs into groups of blocks (GOBs), wherein each GOB corresponds to a slice of the picture and the motion vector data in each GOB is independent of any other GOBs;

constructing an erasure slice comprised of another GOB, wherein the GOB of the erasure slice is further comprised of another plurality of MBs, wherein each one of the plurality of MBs of the erasure slice corresponds to one of the plurality of MBs in each of a plurality of GOB of the picture and wherein the erasure slice is constructed with data in at least some of the plurality of MBs combined from corresponding MBs in the GOBs of the picture;

encoding each one of the GOBs of the picture data and the erasure slice into a predetermined standard compliant packet; and transmitting each standard compliant packet.

2. The method of claim 1, wherein the step of constructing an erasure slice includes forming motion vector data for each one of the plurality of MBs of the erasure slice by linearly combining motion vector data of the corresponding one of the plurality of MBs in each GOB of the picture data.

3. The method of claim 2, wherein the step of forming motion vector data for each one of the plurality of MBs further comprises modulo summation performed using the equations:

$$MVE_x(i) = \sum_j MV_x(i, j);$$

and $$MVE_y(i) = \sum_j MV_y(i, j);$$

wherein $MV_x(i,j)$ and $MV_y(i,j)$ are the x and y motion vector components, respectively, for an ith one of the MBs of a jth GOB of picture data and $MVE_x(i)$ and $MVE_y(i)$ are the x and y motion vector components, respectively, for an ith one of the MBs of the GOB of the erasure slice.

4. The method of claim 1, wherein the step of constructing an erasure slice includes forming the residual data for each one of the plurality of MBs of the erasure slice by modulo summing the coefficients of the corresponding one of the plurality of MBs in each GOB of the picture data.

5. The method of claim 1, wherein the step of constructing an erasure slice includes forming a DQUANT value for each one of the plurality of MBs of the erasure slice by modulo summing the DQUANT value of the corresponding one of the plurality of MBs in each GOB of the picture data.

6. The method of claim 1, wherein the step of constructing an erasure slice includes forming a MTYPE value for each one of the plurality of MBs of the erasure slice by:

setting the MTYPE value for each one of the plurality of MBs of the erasure slice to INTER if the MTYPE value for each of the corresponding ones of the plurality of MBs in each GOB of the picture data is INTER; and setting the MTYPE value for each one of the plurality of MBs of the erasure slice to INTRA if the MTYPE value is INTRA for any of the corresponding ones of the plurality of MBs in each GOB.

7. The method of claim 1, wherein the step of constructing an erasure slice includes:

determining an activity level of the picture; and not forming an erasure slice if the activity level of the picture is less than a predetermined activity threshold level.

8. The method of claim 7, wherein the step of determining an activity level of the picture includes determining the activity level using the equation:

$$\sum_i \sum_j (|MV_x(i, j)| + |MV_y(i, j)|)$$

wherein $MV_x(i,j)$ and $MV_y(i,j)$ are the x and y motion vector components, respectively, for an ith one of the MBs of a jth GOB of picture data.

9. The method of claim 1, wherein the step of constructing an erasure slice includes:

dividing the picture data into lossy and lossless reconstruction categories; and allocating a variable number of bits in the erasure slice to at least one of the reconstruction categories.

10. The method of claim 9, wherein the step of allocating a variable number of bits in the erasure slice to at least one of the reconstruction categories includes varying the number of bits to the at least one of the reconstruction categories responsive to transmission channel characteristics.

11. The method of claim 1, the method further comprising:

receiving the predetermined standard compliant packets for the picture;

determining whether one of the GOBs of picture data has been lost in transmission;

reconstructing a lost one of the GOBs of picture data from the received GOBs of picture data and the erasure slice GOB.

12. The method of claim 11, wherein the step of reconstructing a lost one of the GOBs of picture data includes:

reconstructing motion vector data for each one of the plurality of MBs of the lost one of the GOBs of picture data by linearly combining motion vector data of the corresponding one of the plurality of MBs in each received GOB of the picture data and the corresponding one of the plurality of MBs in the erasure slice GOB.

13. The method of claim 12, wherein the step of reconstructing motion vector data for each one of the plurality of MBs of the lost one of the GOBs of picture data further comprises modulo summation performed using the equations:

$$MVL_x(i) = -\sum_j MV_x(i, j) + MVE_x(i);$$

and $$MVL_y(i) = -\sum_j MV_y(i, j) + MVE_y(i);$$

wherein $MVL_x(i)$ and $MVL_y(i)$ are the x and y motion vector components, respectively, for an ith one of the MBs of the lost GOB of picture data, $MV_x(i,j)$ and $MV_y(i,j)$ are the x and y motion vector components, respectively, for an ith one of the MBs of a jth GOB of picture data, excluding the lost GOB of picture data, and $MVE_x(i)$ and $MVE_y(i)$ are the x and y motion vector components, respectively, for an ith one of the MBs of the GOB of the erasure slice.

14. The method of claim 11, wherein the step of reconstructing a lost one of the GOBs of picture data includes:

reconstructing residual data for each one of the plurality of MBs of the lost one of the GOBs of picture data by summing residual data of the corresponding one of the plurality of MBs in each received GOB of the picture data and the corresponding one of the plurality of MBs in the erasure slice GOB.

15. The method of claim 11, wherein the step of reconstructing a lost one of the GOBs of picture data includes:

reconstructing a DQUANT value for each one of the plurality of MBs of the lost one of the GOBs of picture data by modulo summing the DQUANT value of the corresponding one of the plurality of MBs in each received GOB of the picture data and the corresponding one of the plurality of MBs in the erasure slice GOB.

16. The method of claim 11, wherein the step of reconstructing a lost one of the GOBs of picture data includes:

setting an MTYPE value for each one of the plurality of MBs of the lost one of the GOBs of picture data to the MTYPE value of the corresponding one of the plurality of MBs in the erasure slice GOB.

17. The method of claim 11, wherein:

the step of constructing an erasure slice comprised of another GOB further comprises constructing multiple erasure slices, each one of the multiple erasure slices being comprised of a respective plurality of MBs, and wherein each one of the respective plurality of MBs for each of the multiple erasure slices corresponds to one of the plurality of MBs in each GOB of a subset of the picture data; and the step of encoding each one of the GOBs of the picture data and the erasure slice into a predetermined standard compliant packet further comprises encoding each one of the GOBs of the picture data and each one of the multiple erasure slices into standard compliant packets.

18. A block-based coding standard compliant encoder comprising:

a subtractor having first and second input terminals and an output terminal, the subtractor being configured to subtract a signal received at the second input terminal from a signal received at the first input terminal in order to produce a difference signal at the output terminal, wherein the first input terminal of the subtractor is configured to receive video data corresponding to a picture;

a transformer having input and output terminals, the input terminal of the transformer being coupled to the output terminal of the subtractor, wherein the transformer is configured to transform the difference signal received at the input terminal of the transformer into residual data output at the output terminal of the transformer;

a quantizer having input and output terminals and a control terminal, the input terminal of the quantizer being coupled to the output terminal of the transformer, wherein the quantizer is configured to quantize the residual data received from the transformer responsive to a QUANT signal received at the control terminal of the quantizer to produce quantized data output at the output terminal of the quantizer;

a variable length encoder and multiplexor having an input terminal coupled to the output terminal of the quantizer, an output terminal, an INTER/INTRA terminal configured to receive an INTER/INTRA signal, a PTYPE terminal configured to receive a PTYPE signal, a QUANT terminal configured to receive the QUANT signal, and a motion vector terminal configured to receive motion vector data, wherein the input terminal of the variable length encoder and multiplexor is coupled to the output terminal of the quantizer, and wherein the variable length encoder and multiplexor is configured to encode the quantized data and form block-based coding standard compliant data packets which include the INTER/INTRA, PTYPE and QUANT signals and the motion vector data and wherein each group of blocks of the block-based coding standard compliant data packets corresponds to a slice of picture data;

a buffer configured to receive and store the block-based coding standard compliant data packets formed by the variable length encoder and multiplexor; and an erasure slice constructor configured to receive the block-based coding standard compliant data packets stored in the buffer and, responsive thereto, generate an erasure slice corresponding to the picture from which one of the block-based coding standard compliant data packets can be reconstructed from the remaining block-based coding standard compliant data packets for the picture and the erasure slice for the picture.

19. The encoder of claim 18, wherein the erasure slice constructor is further configured to form motion vector data for each one of a plurality of macroblocks of the erasure slice by linearly combining motion vector data of the corresponding one of a plurality of macroblocks in each group of blocks of the picture data.

20. The encoder of claim 19, wherein the erasure slice constructor is further configured to form the motion vector data -for each one of the plurality of macroblocks using the equations:

$$MVE_x(i) = \sum_j MV_x(i, j);$$

and $$MVE_y(i) = \sum_j MV_y(i, j);$$

wherein $MV_x(i,j)$ and $MV_y(i,j)$ are the x and y motion vector components, respectively, for an ith one of the macroblocks of a jth group of blocks of picture data and $MVE_x(i)$ and $MVE_y(i)$ are the x and y motion vector components, respectively, for an ith one of the macroblocks of the erasure slice.

21. The encoder of claim 18, wherein the erasure slice constructor is further configured to form the residual data for each one of the plurality of MBs of the erasure slice by summing the coefficients of the corresponding one of the plurality of MBs in each GOB of the picture data.

22. The encoder of claim 18, wherein the erasure slice constructor is further configured to form a DQUANT value for each one of the plurality of MBs of the erasure slice by modulo summing the DQUANT value of the corresponding one of the plurality of MBs in each GOB of the picture data.

23. The encoder of claim 18, wherein the erasure slice constructor is further configured to form a MTYPE value for each one of the plurality of MBs of the erasure slice by:

setting the MTYPE value for each one of the plurality of MBs of the erasure slice to INTER if the MTYPE value for each of the corresponding ones of the plurality of MBs in each GOB of the picture data is INTER; and setting the MTYPE value for each one of the plurality of MBs of the erasure slice to INTRA if the MTYPE value is INTRA for any of the corresponding ones of the plurality of MBs in each GOB.

24. The encoder of claim 18, wherein the erasure slice constructor is further configured to:

determine an activity level of the picture; and only form an erasure slice if the activity level of the picture is greater than a predetermined activity threshold level.

25. The encoder of claim 24, wherein the erasure slice constructor is further configured to determine the activity level using the equation:

$$\sum_i \sum_j (|MV_x(i,j)| + |MV_y(i,j)|)$$

wherein $MV_x(i,j)$ and $MV_y(i,j)$ are the x and y motion vector components, respectively, for an ith one of the MBs of a jth GOB of picture data.

26. The encoder of claim 18, wherein the erasure slice constructor is further configured to:
divide the picture data into lossy and lossless reconstruction categories; and
allocate a variable number of bits in the erasure slice to at least one of the reconstruction categories.

27. The encoder of claim 26, wherein the erasure slice constructor is further configured to vary the number of bits to the at least one of the reconstruction categories responsive to transmission channel characteristics.

28. A block-based coding standard decoder comprising:
an input buffer configured to receive and store block-based coding standard compliant data packets corresponding to a picture along with an erasure slice corresponding to the picture;
a variable length decoder and demultiplexor configured to receive and decode the block-based coding standard compliant data packets, the variable length decoder and demultiplexor being configured to output quantized data decoded from the block-based coding standard compliant data packets at an output terminal and extract an INTER/INTRA signal, a PTYPE signal, a QUANT signal and motion vector data from the block-based coding standard compliant data packets which are output at an INTER/INTRA terminal, a PTYPE terminal, a QUANT terminal and a motion vector terminal, respectively, and where the variable length decoder and demultiplexor is further configured to extract and output group of blocks header information from the block-based coding standard data packets at an header information terminal;
an inverse quantizer having input and output terminals and a control terminal, the input terminal of the quantizer being coupled to the output terminal of the variable length decoder and demultiplexor, wherein the inverse quantizer is configured to inverse quantize the quantized data received from the variable length decoder and demultiplexor responsive to the QUANT signal received at the control terminal of the inverse quantizer to produce residual data output at the output terminal of the inverse quantizer;
an inverse transformer having input and output terminals, the input terminal of the inverse transformer being coupled to the output terminal of the inverse quantizer, wherein the inverse transformer is configured to inverse transform the residual data received at the input terminal of the inverse transformer into a difference signal at the output terminal of the inverse transformer;
a motion compensation predictor configured to receive the INTER/INTRA and PTYPE signals and the motion vector data and, responsive thereto, generate a reference signal;
an adder configured to receive the reference signal and the difference signal and, responsive thereto, generate a video signal corresponding to the picture; and
an erasure slice reconstructor configured to receive the block-based coding standard data packets and the erasure slice stored in the buffer, where the erasure slice reconstructor is further configured to receive the group of blocks header information and, responsive thereto, determine whether there is a lost block-based coding standard data packet and reconstruct the lost packet from the remaining block-based coding standard compliant data packets for the picture and the erasure slice for the picture.

29. The decoder of claim 28, wherein the erasure slice reconstructor is further configured to reconstruct motion vector data for each one of a plurality of macroblocks of the lost block-based coding standard compliant data packet by linearly combining motion vector data of a corresponding one of a plurality of macroblocks in each received block-based coding standard compliant data packet and a corresponding one of a plurality of macroblocks in the erasure slice.

30. The decoder of claim 29, wherein the erasure slice reconstructor is further configured to reconstruct the motion vector data for each one of the plurality of macroblocks of the lost block-based coding standard compliant data packet by performing the following equations:

$$MVL_x(i) = -\sum_j MV_x(i,j) + MVE_x(i);$$

and $$MVL_y(i) = -\sum_j MV_y(i,j) + MVE_y(i);$$

wherein $MVL_x(i)$ and $MVL_y(i)$ are x and y motion vector components, respectively, for an ith one of the macroblocks of the lost block-based coding standard compliant data packet of picture data, $MV_x((i,j)$ and $MV_y(i,j)$ are x and y motion vector components, respectively, for an ith one of the macroblocks of a jth block-based coding standard compliant data packet of picture data, excluding the lost block-based coding standard compliant data packet of picture data, and $MVE_x(i)$ and $MVE_y(i)$ are x and y motion vector components, respectively, for an ith one of the macroblocks of the erasure slice.

31. The decoder of claim 28, wherein the erasure slice reconstructor is further configured to reconstruct residual data for each one of a plurality of macroblocks of the lost one of the block-based coding standard compliant data packets of picture data by summing residual data of a corresponding one of the plurality of macroblocks in each received block-based coding standard compliant data packet of the picture data and a corresponding one of the plurality of macroblocks in the erasure slice.

32. The decoder of claim 28, wherein the erasure slice reconstructor is further configured to reconstruct a DQUANT value for each one of a plurality of macroblocks of the lost one of the block-based coding standard compliant data packets of picture data by modulo summing the DQUANT value of a corresponding one of the plurality of macroblocks in each received block-based coding standard compliant data packet of the picture data and a corresponding one of the plurality of macroblocks in the erasure slice.

33. The decoder of claim 28, wherein the erasure slice reconstructor is further configured to set an MTYPE value for each one of a plurality of macroblocks of the lost one of the block-based coding standard compliant data packets of picture data to the MTYPE value of a corresponding one of the plurality of macroblocks in the erasure slice.

* * * * *